US008022328B2

(12) United States Patent
Scherer et al.

(10) Patent No.: US 8,022,328 B2
(45) Date of Patent: Sep. 20, 2011

(54) DEVICE FOR DETECTING FAULTY POSITION AND SEPARATING FASTENERS AND SPACERS AS WELL AS METHOD

(75) Inventors: Rico Scherer, Westersede (DE); Malte Meyeroltmanns, Bremen (DE); Tobias Peisker, Achim (DE)

(73) Assignee: Airbus Operations GmbH, Hamburg (DE)

( * ) Notice: Subject to any disclaimer, the term of this patent is extended or adjusted under 35 U.S.C. 154(b) by 250 days.

(21) Appl. No.: 12/268,035

(22) Filed: Nov. 10, 2008

(65) Prior Publication Data

US 2009/0160455 A1 Jun. 25, 2009

Related U.S. Application Data

(60) Provisional application No. 61/014,756, filed on Dec. 19, 2007.

(51) Int. Cl.
*B07C 5/344* (2006.01)
(52) U.S. Cl. ......... 209/571; 209/552; 209/929; 356/394
(58) Field of Classification Search .................. 209/552, 209/571, 929; 29/407.04, 702, 715; 356/375, 356/394; 382/141, 152
See application file for complete search history.

(56) References Cited

U.S. PATENT DOCUMENTS

| 3,168,196 A * | 2/1965 | Harder ........................... 209/605 |
| 3,650,397 A * | 3/1972 | Bornemeier .................. 209/585 |
| 4,877,138 A * | 10/1989 | Motiwala ...................... 209/601 |
| 5,727,300 A * | 3/1998 | Ekdahl et al. .............. 29/407.04 |
| 5,823,356 A * | 10/1998 | Goodrich et al. ............. 209/601 |
| 6,634,267 B1 * | 10/2003 | Edens et al. ...................... 83/13 |

FOREIGN PATENT DOCUMENTS

| DE | 19926947 A1 | 12/2000 |
| DE | 20215364 U1 | 9/2003 |
| DE | 69632309 T2 | 9/2004 |

OTHER PUBLICATIONS

German Examination Report dated Dec. 19, 2007.

* cited by examiner

*Primary Examiner* — Terrell H Matthews
(74) *Attorney, Agent, or Firm* — Perman & Green, LLP (57) ABSTRACT

A device for detecting the faulty position of and separating fasteners, more particularly blind rivets in a continuously operating conveyor apparatus, by means of which the fasteners are supplied to an automated joining machine, wherein each fastener is followed in the normal case by a spacer. According to the disclosed embodiments the device has at least three detectors, more particularly contactless inductively acting ring initiators with which on the one hand fasteners can be differentiated from spacers and on the other hand fasteners in the correct position can be differentiated from fasteners in the faulty position in the conveyor apparatus, more particularly in a supply tube. As a result of the at least three ring detectors a minimum-wear low-maintenance operation is ensured so that outage times of the rivet setter and automated riveting machine are reduced as a result of the device connected in on the input side. Furthermore a complex breakdown recognition is possible with corresponding evaluation. Furthermore the disclosed embodiments relate to a method for detecting the position of and separating fasteners in the conveyor apparatus by means of the device.

11 Claims, 6 Drawing Sheets

|  | Ring initiator | Spacer | Rivet position in order | Rivet in faulty position | Breakdown |
|---|---|---|---|---|---|
| Fig. 1 | 7 | 0 | 0 | 0 | I, ↑↓ |
|  | 6 | 0 | I | I | X |
|  | 5 | I | I | 0 | X |
| Fig. 2 | 7 | 0 | 0 | 0 | I, ↑↓ |
|  | 6 | 0 | I | I | X |
|  | 5 | I | I | 0 | X |
| Fig. 3 | 7 | 0 | 0 | 0 | I, ↑↓ |
|  | 6 | 0 | I | I | X |
|  | 5 | I | I | 0 | X |
| Fig. 4 | 7 | 0 | 0 | 0 | I, ↑↓ |
|  | 6 | I | I | I | X |
|  | 5 | I | I | 0 | X |
| Fig. 5 | 7 | 0 | 0 | 0 | I, ↑↓ |
|  | 6 | 0 | I | I | X |
|  | 5 | I | I | 0 | X |
| Fig. 6 | 7 | 0 | 0 | 0 | I, ↑↓ |
|  | 6 | 0 | I | I | X |
|  | 5 | I | I | 0 | X |
| Fig. 7 | 7 | 0 | 0 | 0 | I, ↑↓ |
|  | 6 | 0 | I | I | X |
|  | 5 | I | I | 0 | X |
| Fig. 8 | 7 | 0 | 0 | 0 | I, ↑↓ |
|  | 6 | 0 | I | I | X |
|  | 5 | I | I | 0 | X |
| Fig. 9 | 7 | 0 | 0 | 0 | I, ↑↓ |
|  | 6 | I | I | I | X |
|  | 5 | I | I | 0 | X |
| Fig. 10 | 7 | 0 | 0 | 0 | I, ↑↓ |
|  | 6 | 0 | I | I | X |
|  | 5 | 0 | I | 0 | X |

Fig. 11

DEVICE FOR DETECTING FAULTY POSITION AND SEPARATING FASTENERS AND SPACERS AS WELL AS METHOD

CROSS REFERENCE TO RELATED APPLICATION

This application claims priority to, and the benefit of, U.S. Provisional Patent Application Ser. No. 61/014,756, filed on Dec. 19, 2007, the disclosure of which is incorporated herein by reference in its entirety.

BACKGROUND

1. Field

The disclosed embodiments relate to a device for separating and detecting the faulty position of fasteners, more particularly blind rivets, in a continuously operating conveyor apparatus by means of which the fasteners are supplied to an automated joining machine wherein each fastener in the normal case is followed by a spacer.

Furthermore the disclosed embodiments relate to a method for separating and detecting the faulty position by means of the device.

2. Brief Description of Related Developments

Automated riveting machines for joining large-format sheet metal parts in the aircraft industry are supplied with a continuous stream of blind rivets through supply tubes. In order to prevent the blind rivets from jamming in the supply tube or conveyor tube each blind rivet is followed by a spacer. An external diameter of the blind rivets and spacers is each time slightly smaller than an internal diameter of the supply tube. There are frequently faults as the supply tube is loaded with blind rivets and spacers. In these cases the blind rivets are introduced for example turned round by 180° into the supply tube or a spacer is missing so that two blind rivets follow directly after one another. Such faulty positions of the blind rivets and missing spacers can lead to breakdowns in the operating cycle of the following automated riveting machine. Distinguishing between the spacers and blind rivets in the conveyor tube is carried out with a test fork. The opening width of the test fork corresponds roughly to the cross-sectional geometry of the break-off pin of the inserted blind rivets. If the blind rivet lies with the correct orientation in the supply tube—that is the rivet body lies in the conveyor direction—then the fork can slide substantially free of resistance over the break-off pin, and the blind rivet is supplied via a switching gate to the rivet inserter of the automatic riveting machine. If on the other hand a spacer is located in the supply tube then the test fork does not reach its end position within the predetermined time and the spacer is ejected.

As a result of the high supply speed of the rivets and the mechanical stress through the spacers there is a high degree of wear and risk of breakdown with the test fork. Furthermore an incorrect position of the blind rivets in the supply tube cannot be reliably differentiated from a general breakdown, such as for example a missing spacer or jamming of the test fork.

SUMMARY

The aspect of the disclosed embodiments is to overcome the drawbacks described above regarding the supply of blind rivets in automated riveting machines.

This is achieved through a device and through a method for separating and detecting the faulty position of fasteners according to patent claim 1 or patent claim 12. Preferred embodiments form the subject of the relevant dependent claims.

Since the position of the fasteners can be determined through at least three contactless detectors and the fasteners in a faulty position as well as the spacers can be removed from the conveyor apparatus by means of switching gates so that only fasteners in a correct position are fed individually to the automated joining machine, a faulty position of each and any blind rivet can be reliably detected. Furthermore a guaranteed distinction between a blind rivet and a spacer is possible through an evaluation of the output signals of the three detectors by means of an electronic control unit.

The contactless recognition of the position of the blind rivets in the supply tube enables a practically wear-free, low-maintenance and therefore fail-safe operation of the device. Stationary periods of the automated joining machine as a result of incorrectly supplied blind rivets or inadvertently non-ejected spacers are avoided. Furthermore the device permits a reliable separation of the blind rivets which are supplied continuously in the supply tube.

A further development of the disclosed embodiments proposes that the detectors are formed with inductively and/or capacitively acting ring initiators which concentrically surround the conveyor apparatus, more particularly a supply tube. A structurally simple design is hereby guaranteed since the detectors concentrically surround the conveyor apparatus, more particularly the supply tube. Furthermore a reliable detection of the blind rivets and the spacers is achieved by using the ring initiators.

A further development of the disclosed embodiments proposes that a response threshold of the ring initiators can be adjusted preferably infinitely during passage of a fastener and/or a spacer. This modification permits for example a reliable distinction between the break-off pin and the rivet body of a blind rivet through evaluation of the three output signals of the detectors in the region of the supply tube so that it is possible to detect a position of the blind rivet. Furthermore different response thresholds enable an unequivocal distinction between a blind rivet and a spacer.

According to a further development it is proposed that the switching gates are formed with a slider which is horizontally displaceable by means of at least one actuator wherein the slider has at least a first and a second bore as well as three settings. As a result of this design of switching gate as slider with three possible settings ("measuring position", "ideal position", "error position") a structurally simple design of the switching gate is guaranteed which ensures a practically fault-free operation.

A further development proposes that the slider is fitted with at least one supply tube on the upper side, a transfer tube on the lower side and a discharge tube on the lower side. This enables easy integration of the device according to the disclosed embodiments into already existing conveyor systems and supply systems which operate as a rule with supply tubes or the like, for automated riveting machines.

According to a further development it is proposed that there is at least one further detector, more particularly at least one ring initiator, provided in the region of each of the transfer tube and discharge tube. It becomes possible hereby to move the slider in the switching gate only when the relevant blind rivet or the relevant spacer has passed completely through the switching gate.

A further development proposes that the at least three ring initiators are arranged one above the other in the region of the supply tube and surrounds this concentrically wherein a vertical spacing between the at least three ring initiators can be adjusted. This hereby allows the device to be adapted for detecting and differentiating between fasteners or blind rivets having different longitudinal dimensions. This adaptation is important if for example the position of different sized blind rivets, screws or nails in the conveyor direction is to be detected.

The method according to patent claim 12 has the following features.

Since a slider for receiving a fastener and/or a spacer is initially located in a measuring position, the relevant output signals of the at least three detectors are then detected by the control unit and evaluated using an evaluation table and finally the slider is moved by the at least one actuator between the measuring position, the ideal position and the error position, a reliable distinction is possible between spacers and blind rivets on the one hand as well as on the other hand between blind rivets with a correct or incorrect orientation relative to the conveyor direction through evaluation of the output signals of the three ring initiators which are arranged in the region of the supply tube.

Further features and advantages of the disclosed embodiments are apparent from the following description of preferred embodiments wherein reference is made to the accompanying drawings.

BRIEF DESCRIPTION OF THE DRAWINGS

In the drawings the same structural elements each have the same reference numerals. Throughout the following description reference is made equally to FIGS. 1 to 10.

DETAILED DESCRIPTION OF THE DRAWINGS

Figure 1:
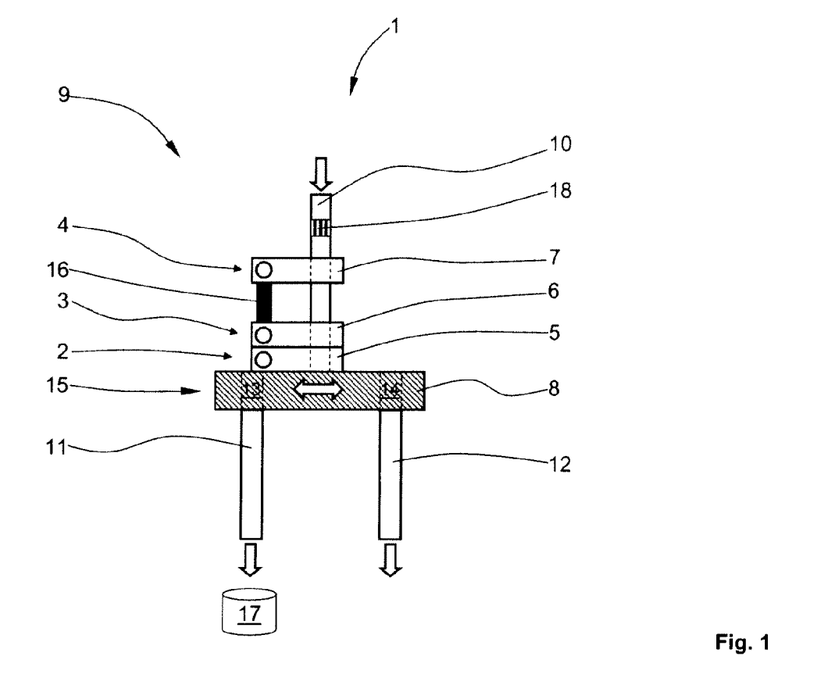
FIG. 1 shows the quite diagrammatic principal structure of the device.

FIG. 1 illustrates the principal structural design of a device according to the disclosed embodiments. The device 1 comprises inter alia the three detectors 2 to 4 which in the illustrated embodiment are formed as inductively operating ring initiators 5 to 7, and a slider 8. A conveyor apparatus 9 contains a supply tube 10, a discharge tube 11 as well as a transfer tube 12. The discharge tube 11 as well as the transfer tube 12 open into first and second bores 13, 14 inside the slider 8 which in conjunction with the tubes 11 to 12 forms the switching gate 15. The slider 8 is displaceable horizontally in the direction of the white direction arrow into three settings ("measuring position", "ideal position", "error position") by means of at least one actuator (not shown). Between the uppermost ring initiator 7 and the ring initiator 6 there is a distance member 16 with which the vertical distance between the ring initiators 7, 6 can be adjusted. Further distance members can be provided for vertically adjusting the remaining ring initiators 5, 6. It is hereby possible to detect the position of fasteners with different longitudinal dimensions which can be in particular metal blind rivets with a rivet body and a break-off pin. The conveyor direction of the blind rivets is shown throughout in all figures by white direction arrows in the region of the supply tube 10, discharge tube 11 as well as transfer tube 12.

The supply of blind rivets into the device 1 takes place through the supply tube 10 (conveyor tube), whilst transferring the blind rivets in their correct alignment in relation to the conveyor direction to a rivet setter (not shown) of an automated riveting machine (similarly not shown) takes place through the transfer tube 12. Blind rivets in a faulty position or spacers are ejected via the discharge tube 11. The supply tube 10, discharge tube 11 as well as the transfer tube 12 are formed by non-metal elastic plastics in order to ensure detection of the preferably metal blind rivets and spacers through the inductively operating ring initiators 5 to 7. Instead of plastics tubes it is also possible for example to use plastic pipelines. Instead of the embodiment of the switching gate 15 with elastic plastics tubes as shown in the illustrated example other mechanical switch-overs can also be provided. Furthermore underneath the discharge tube 11 there is a receptacle 17 which serves to receive the faulty positioned blind rivets and the surplus spacers after the transport process of the rivets through the supply tube 10.

Furthermore the device 1 comprises a control unit (not shown) by means of which at least the output signals of the ring initiators 5 to 7 are detected and by means of which the horizontal position of the slider 8 is controlled by at least one actuator. The at least one actuator is preferably a multi-phase compressed air cylinder. Underneath the slider 8 at both the discharge tube 11 and transfer tube 12 is a further ring detector which for improved clarity is not shown. The completed passage of the spacers and blind rivets through the bores 13, 14 is detected by means of these two (lower) ring detectors. The horizontal movement of the slider 8 by the actuator only takes place at that moment when the lower ring initiators have reported the passage of the relevant blind rivet or spacer through the slider 8 in order to prevent the switching gate 15 from becoming jammed by the blind rivets or spacers located in the bores 13, 14.

The respective switching states or output signals of the ring initiators 5 to 7 are symbolised in all FIGS. 1 to 10 by small black circles set therein. If the respective ring initiator 5 to 7 registers a metal object by way of example, such as for example a blind rivet or spacer, then the output signal switches into position "I" whilst if there are no spacers or blind rivets present, that is the supply tube 10 is empty then the electrical position changes to "0" (see in particular the complete evaluation table or position table in FIG. 11). The position "I" of the relevant ring initiator 5 to 7 is shown through a cross in the relevant circle whilst the position "0" is symbolised by an empty circle.

In the case of non-metal fastener elements and spacers, such as for example plastics screws, plastics nails or plastics rivets, capacitively and/or optically operating sensors are used in place of the inductively operating ring initiators 5 to 7. The material used for the supply tube 10, discharge tube 11 and transfer tube 12 is then to be selected taking into account the concrete electrical and/or magnetic demands of the detectors or sensors used. In the case of optically acting sensors it may be necessary for example to make the tubes or the pipelines transparent at least in some areas. In place of the inductive ring initiators used it is also possible to use other inductively operating indicators, such as for example bar indicators (conventional contactless limit switches).

Figure 2:
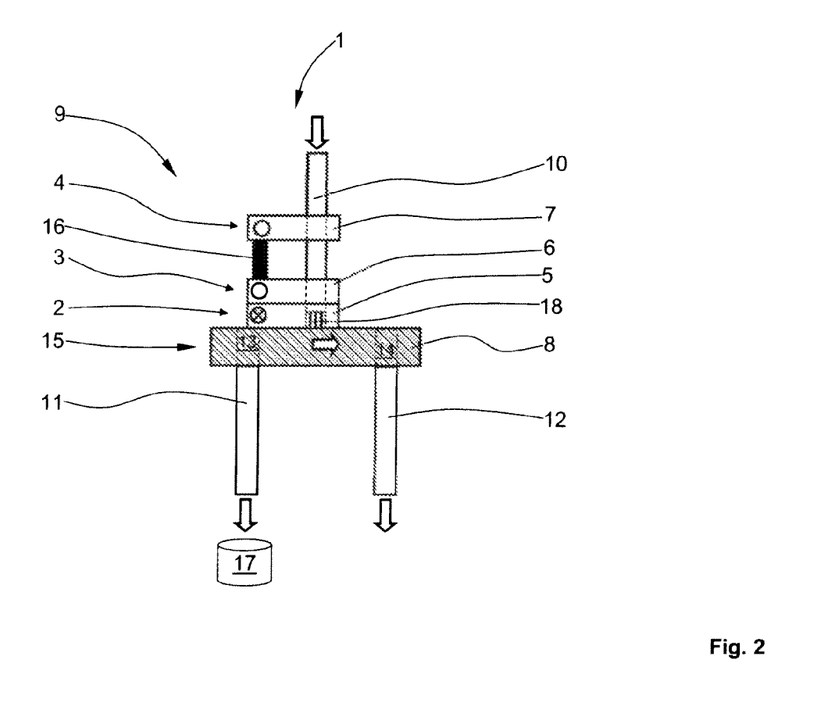
FIGS. 2-10 show the device in different operating positions.

In the illustration of FIGS. 1, 2 the device 1, and the slider 8 respectively, is located in the "measuring position" and a spacer 18 passes through the supply tube 10 so that all ring initiators 5 to 7 are located in the switching position "0". In the supply tube 10 there is a constantly moving continuous (endless) sequence of blind rivets and spacers, wherein in the normal event one spacer always follows each blind rivet in order to prevent the blind rivets from jamming in the supply tube 10. Up to ten rivets hereby pass through the transfer tube 10 per minute.

In the illustration of FIG. 2 the spacer 18 already lies on the slider 8. The ring initiator 5 is in the switching position "I". In this "measuring position" the supply tube 10 is completely covered by the slider 8 so that the spacer 18 cannot pass uncontrolled through the switching gate 15. The evaluation of an evaluation table filed in the measuring and control device reveals for this case that it is a spacer 18 which is located in the supply tube 10. The slider 8 is therefore pushed horizontally to the right in the direction of the small white arrow by means of the actuator (not shown) so that the spacer 18 falls through the discharge tube 11 into the receptacle 17.

Figure 3:
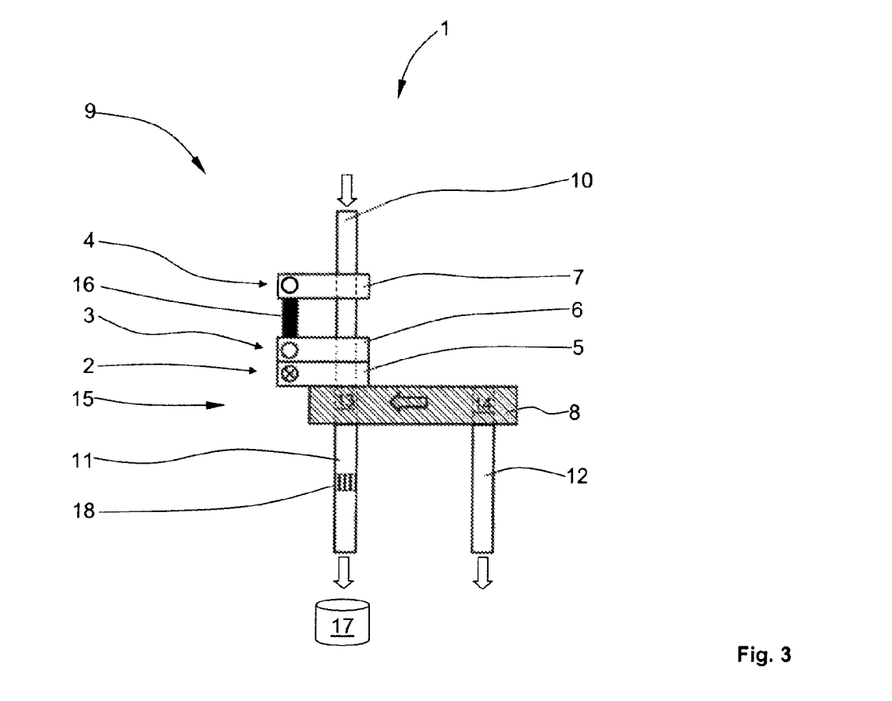

In the illustration of FIG. 3 the device 1 is located in the so-called "error position" and the spacer 18 has already passed through the switching gate 15 in the form of the slider 8 and falls through the discharge tube 11 into the receptacle 17. In this "error position" of the slider 8 a connection is made through the first bore 13 in the slider 8 between the supply tube 10 and the discharge tube 11. Starting from the position of the slider 8 illustrated in FIG. 3 this is pushed back left horizontally in the direction of the white arrow when the lower ring initiator at the discharge tube 11 has reported the passage of the spacer 18. After this the slider 8 is again located in the "starting position" or "measuring position" (see FIG. 4). In the illustration of FIG. 3 the lower ring initiator 5 still sends out an "I" as output signal although the spacer 18 is already located in the discharge tube 11 which is meant to indicate a negative slope of the signal waveform.

Figure 4:
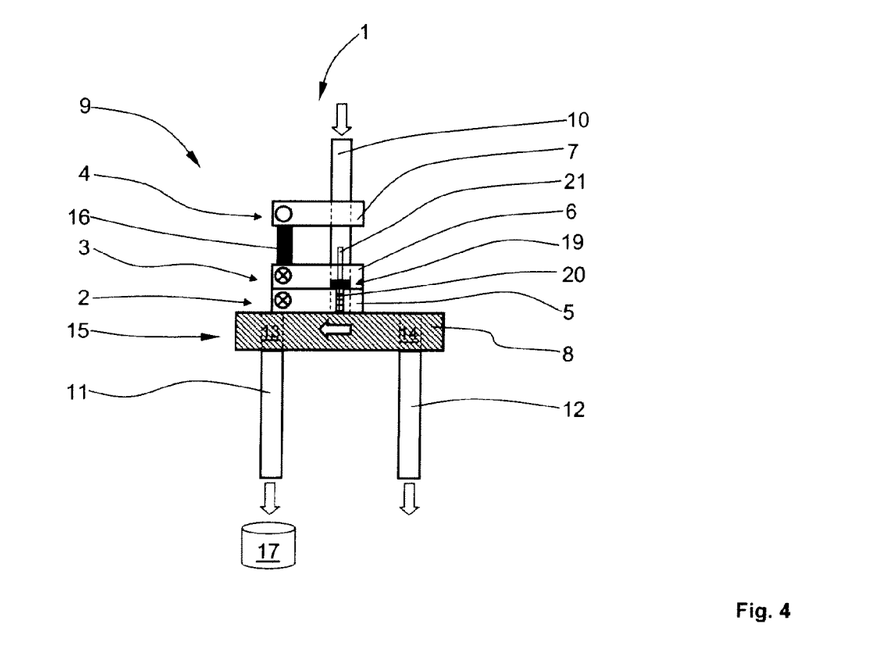

In FIG. 4 the slider 8 is returned to the "measuring position" and a blind rivet 19 with rivet head 20 and break-off pin 21 lies on the slider 8. The blind rivet 19 illustrated in FIG. 4 has the correct orientation in the supply tube 10, that is the rivet head 20 lies in the conveyor direction (white arrow) whilst the break-off pin 21 is directed into the opposite direction. In the event of a correct orientation of the blind rivet 19 both ring initiators 5, 6 respond by switching over to the position "I" whilst the upper ring initiator 7 does not respond, that is remains in the switching position "0". In this case the slider 8 is moved to the left in the direction of the white arrow so that the blind rivet 19 passes into the transfer tube 12 and thus is delivered to the rivet setter of the associated automated riveting machine.

Figure 5:
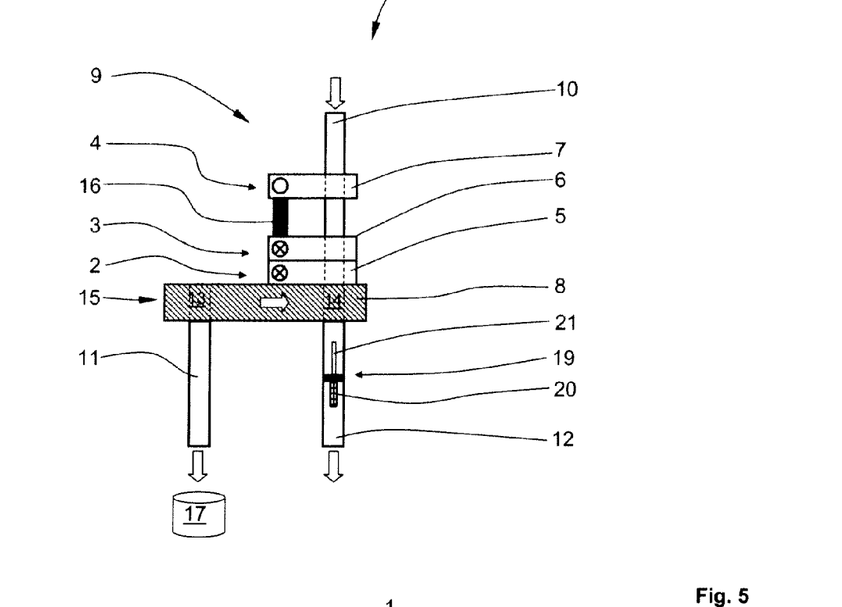

In the illustration of FIG. 5 the device 1 is located in the so-called "ideal position" for blind rivets with a proper orientation in space, in which through the switching gate 15 in the form of the slider 8 a connection exists between the supply tube 10 and the transfer tube 12 and the blind rivet 19 is conveyed further unimpeded into the transfer tube 12. In FIG. 5 the blind rivet 19 is delivered further through the transfer tube 12 to the rivet setter of the automated riveting machine.

In FIG. 6 the device 1 has again reached the "measuring position", but the blind rivet 19 compared to the illustration in FIGS. 4, 5 is located in a position turned by 180°, that is in the so-called "error position" in the supply tube 10 above the slider 8. The term "error position" of the blind rivet 19 means that the break-off pin 21 lies in the conveyor direction whilst the rivet head 20 points into the opposite direction which can lead to serious trouble in the rivet setter of the automated riveting machine which follows. In the event of such faulty positioning the middle ring initiator 6 is located in the "I" switching position whilst the two ring initiators 7, 5 remain in the "0" switching position. In this connection it is a matter of accurately setting the response threshold of the relevant ring initiator 5, 6 since in this situation only the middle ring initiator 6 is permitted to respond although the break-off pin 21 of the blind rivet 20 is located in the detection range of the lower ring initiator 5. This setting is possible since the active cross-section of the break-off pin which is relevant for the inductive position detection of the blind rivet 19 is smaller than that of the rivet head 20. The spacers can occupy no faulty position since these are symmetrical in relation to the conveyor direction.

Figure 6:
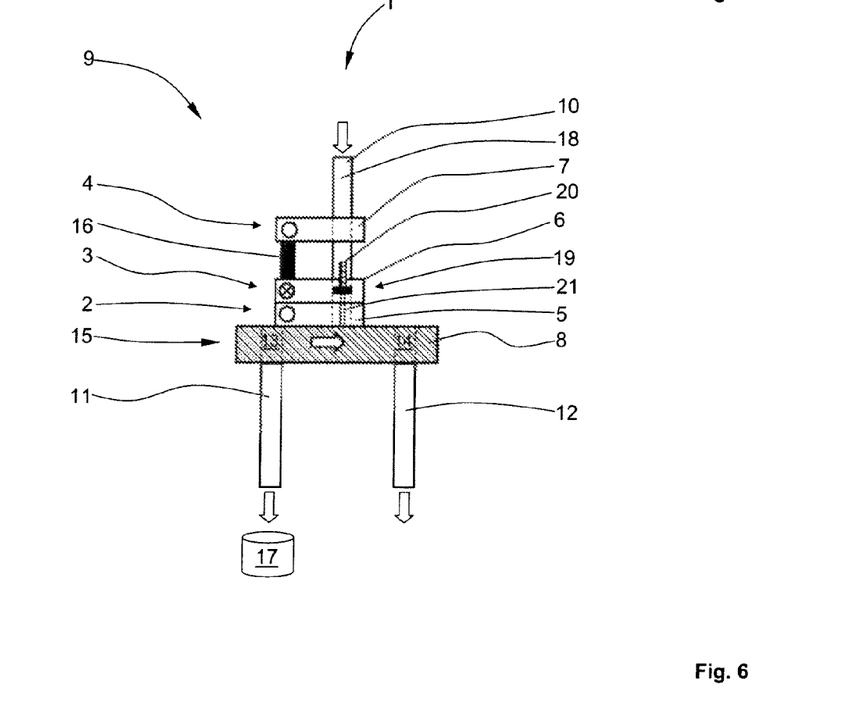
Figure 7:
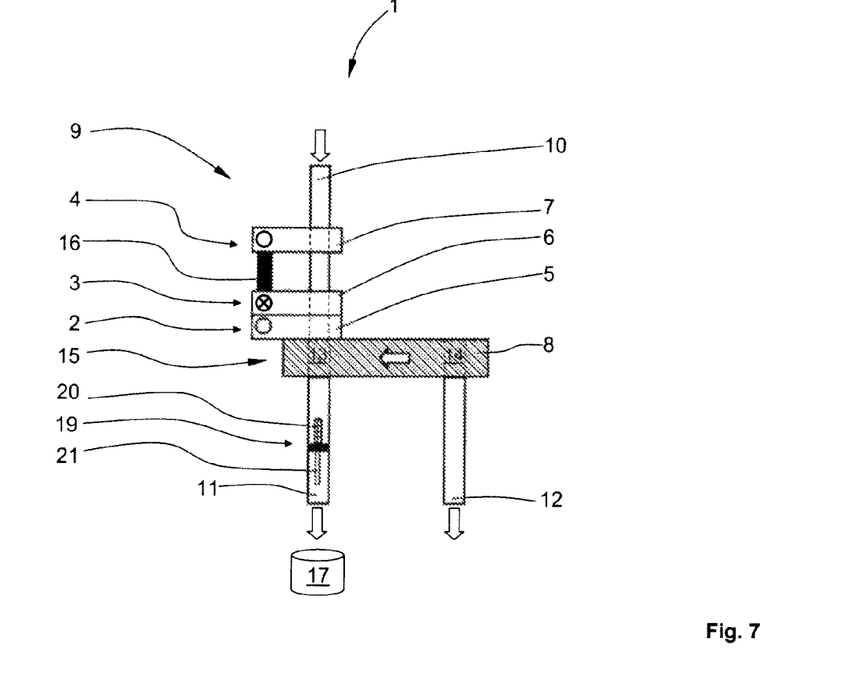

FIG. 7 shows the slider 8 in a position moved so wide—in comparison with the illustration in FIG. 6—that the blind rivet 19 can fall through the discharge tube 11 into the receptacle 17. The slider 8 is then moved back again in the direction of the white arrow into the "measuring position".

Figure 8:
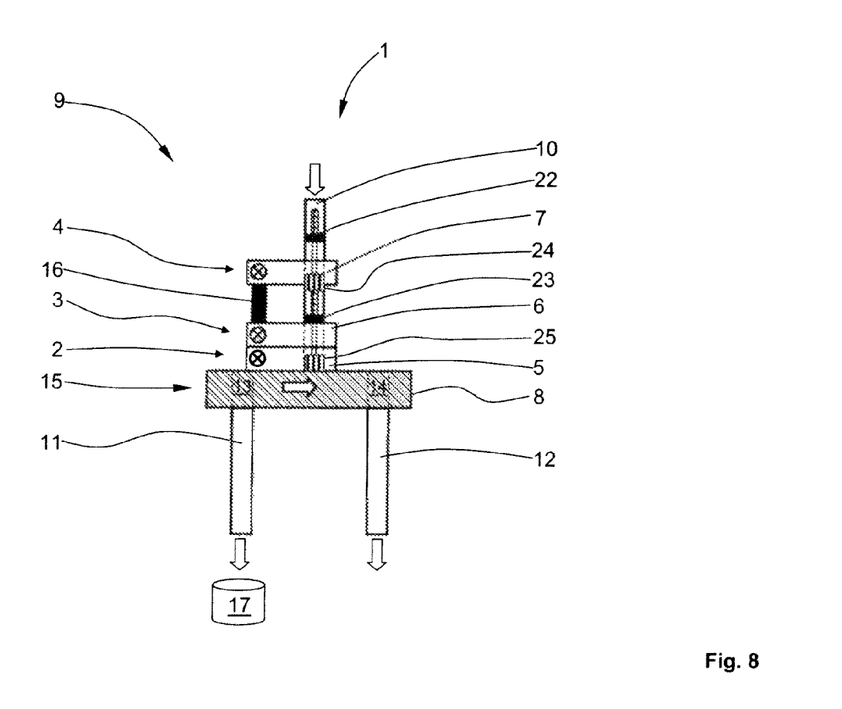

FIG. 8 illustrates a complex breakdown situation in which the blind rivets 22, 23 each rest in the faulty position and in-between the spacers 24, 25 in the supply tube 10 on the slider 8. As opposed to the illustration in FIG. 6 in which only the blind rivet 19 is in the faulty position and only the middle ring initiator 6 is located in the switching position "I", in the breakdown situation of FIG. 8 the upper and middle ring initiators 7, 6 each send out the switching position "I" as output signal. The control unit is hereby able to differentiate between simple and complex breakdown situations.

Figure 9:
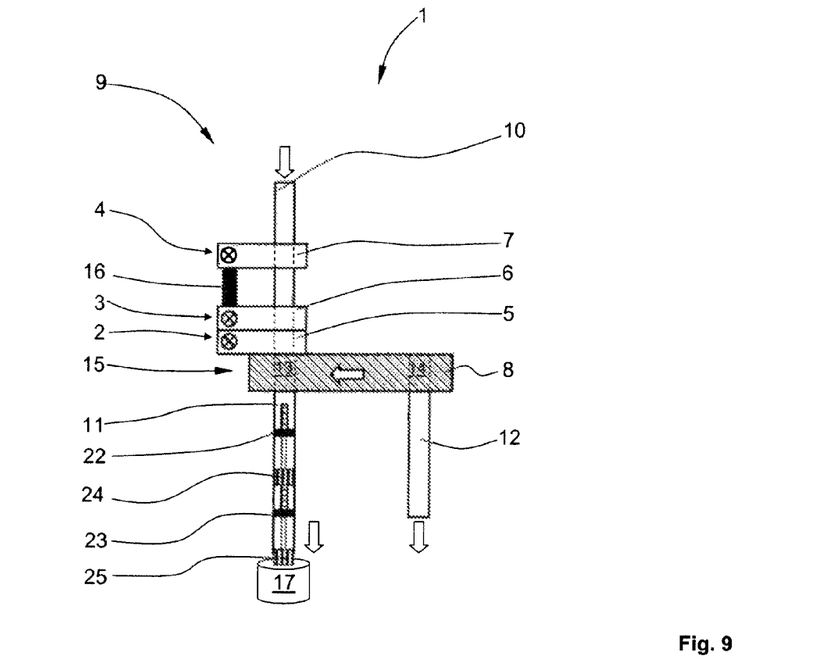
Figure 10:
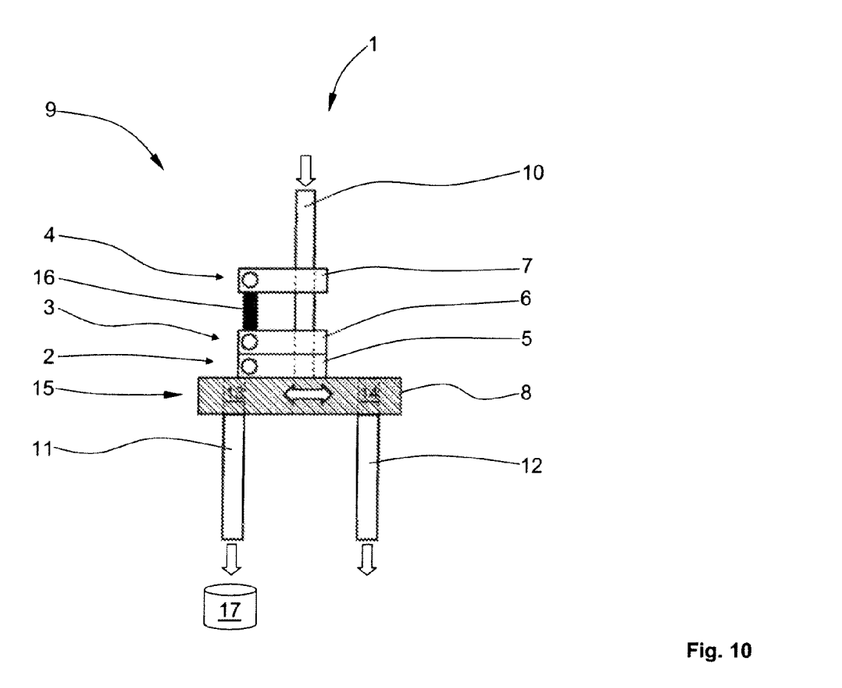

In FIG. 9 the blind rivets 22, 23 as well as the spacers 24, 25 arranged in-between each of them are directed into the receptacle 17 by sliding the slider 8 over the discharge tube 11. The ring initiators 5 to 7 hereby temporarily give out the switching state "I" as output signal to the control unit. The slider 8 then moves back into the starting position by sliding horizontally in the direction of the white arrow which is directed to the left.

In FIG. 10 the device 1 is again located in the "measuring position" in which the identification of the position of the supplied blind rivets and the presence of the spacers are detected.

Figure 11:
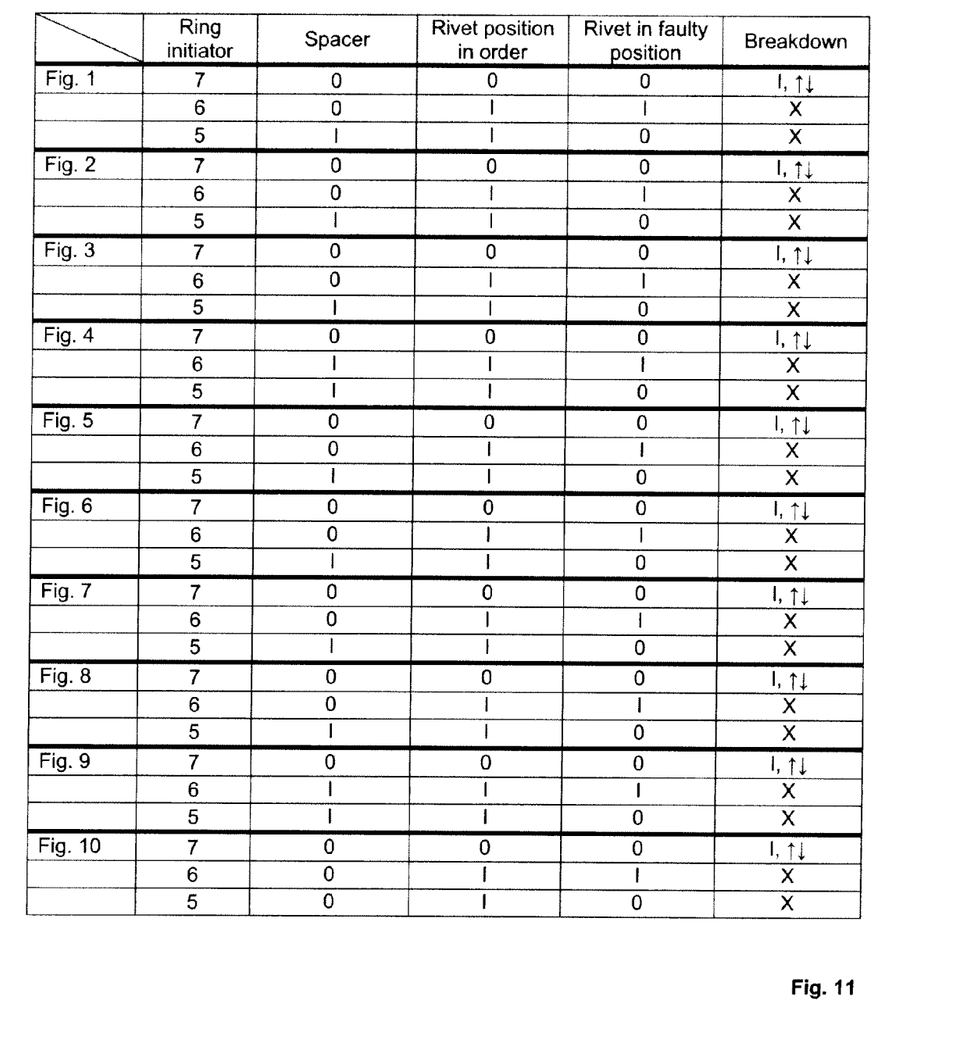
FIG. 11 shows an evaluation table for evaluating the detectors.

In FIG. 11 all the switching positions of the ring initiators 7, 6, 5 in the area of the supply tube 10 are summarised in an evaluation table for the relevant FIGS. 1 to 10. A "0" stands for the switching position "Off" of the relevant ring initiator 5 to 7 so that neither a blind rivet nor a spacer is located in the measuring range of the relevant ring initiator. The "I" ("1") stands for the switching position "On" of the associated ring initiator 5 to 7, that is a blind rivet or spacer is in the active range of the relevant ring initiator 5 to 7. An "X" means that the output signal of the ring initiator 5 to 7 is either "0" or "I", this value is however not important for evaluation in the control unit. The symbol "↑↓" stands for a change of the output signal from "0" to "I" and then from "I" to "0" (positive/negative slope). These signal slopes can be used for detailed evaluation of the type of breakdown situation in the control unit. Using these memorized evaluation tables it is possible for the control unit to differentiate with a high degree of accuracy between blind rivets in the correct delivery position and those in the faulty position, and a spacer as well as a general breakdown in which several blind rivets build up before the slider 8 in the switching gate 15.

LIST OF REFERENCE NUMERALS

1 Device
2 Detector
3 Detector
4 Detector
5 Ring initiator
6 Ring initiator
7 Ring initiator
8 Slider
9 Conveyor apparatus
10 Supply tube
11 Discharge tube
12 Transfer tube
13 First bore 14 Second bore
15 Switching gate
16 Distance member
17 Collecting receptacle
18 Spacer (for blind rivet)
19 Blind rivet
20 Rivet head
21 Break-off pin
22 Blind rivet
23 Blind rivet
24 Spacer (for blind rivet)
25 Spacer

The invention claimed is:

1. A device for detecting the faulty position of and separating fasteners, more particularly blind rivets in a continuously operating conveyor apparatus by means of which the fasteners are supplied to an automated joining machine, wherein each fastener is followed by a spacer, the device comprising:
 at least three contactless detectors configured to determine the position of the fasteners, where the detectors are inductively and/or capacitively operating ring initiators;
 a switching gate configured to remove the fasteners in a faulty position as well as the spacers from the conveyor apparatus so that only fastener elements in the correct position are delivered individually to the automated joining machine, and wherein a response threshold of the ring initiators for the passage of a fastener element or a space can be adjusted in order to determine different sections of the fastener and/or to differentiate between the spacers and the fasteners.

2. A device according to claim 1, wherein the switching gate is formed with a slider which can be displaced horizontally by means of at least one actuator wherein the slider has at least a first and a second bore as well as three settings.

3. A device according to claim 1, wherein the conveyor apparatus comprises at least one supply tube for supplying the fasteners and the spacers, at least one transfer tube for transferring the fasteners in their correct position to the automated joining machine as well as at least one discharge tube for diverting the spacers and the fasteners which are to be ejected wherein the supply tube ends above the slider and the transfer tube opens underneath the slider in the second bore and the discharge tube opens underneath the slider in the first bore.

4. A device according to claim 1, wherein at least one further detector, more particularly at least one further ring initiator is mounted in the regions of the transfer tube and the discharge tube in order to detect the complete passage of a fastener or a spacer through the slider.

5. A device according to claim 1, wherein the at least three ring initiators are mounted one above the other in the region of the supply tube and surround this concentrically wherein a vertical distance between the at least three ring initiators can be adjusted.

6. A device according to claim 1, wherein in a measuring position the supply tube is initially covered by the slider, and in an ideal position the slider opens up a connection between the supply tube and the transfer tube whilst in an error position the slider opens up a connection between the supply tube and the discharge tube wherein the movement of the slider takes place each time in dependence on the output signals of the at least three ring initiators.

7. A device according to claim 1, wherein the at least three ring initiators and the at least one actuator are connected to a control unit in which an evaluation table is filed for evaluating the output signals of the at least three ring initiators.

8. A device according to claim 1, wherein at least spacers can be distinguished from fasteners and fasteners in a correct position can be distinguished from fasteners in a faulty position by means of the output signals of the at least three ring initiators.

9. A device according to claim 1, wherein the fasteners are blind rivets which are made substantially from a metal material, more particularly an aluminium alloy material.

10. A method for separating and detecting the faulty position of fasteners with a device where the fasteners are supplied to an automated joining machine and are followed by a spacer, the method comprising:
 determining the position of the fasteners with at least three contactless detectors, where the detectors are inductively and/or capacitively operating ring initiators;
 detecting and evaluating the relevant outputs signals of the at least three detectors with a control device using an evaluation table; and
 removing the fasteners in a faulty position as well as the spacers from a conveyor apparatus with a switching gate so that only fastener elements in the correct position are delivered individually to the automated joining machine, the switching gate including a slider that is configured for receiving a fastener element and/or a spacer, the slider being located initially in a measuring position and moved by means of at least one actuator between the measuring position, the ideal position and the error position,
 wherein a response threshold of the ring initiators for the passage of the fastener element or the spacer can be adjusted in order to determine different sections of the fastener and/or to differentiate between the spacers and the fasteners.

11. A method according to claim 10, wherein the slider is only then moved back into the measuring position when the relevant fastener or the spacer has left the slider in order to prevent jamming of the slider.

* * * * *

UNITED STATES PATENT AND TRADEMARK OFFICE
CERTIFICATE OF CORRECTION

| | | |
|---|---|---|
| PATENT NO. | : 8,022,328 B2 | Page 1 of 1 |
| APPLICATION NO. | : 12/268035 | |
| DATED | : September 20, 2011 | |
| INVENTOR(S) | : Scherer et al. | |

It is certified that error appears in the above-identified patent and that said Letters Patent is hereby corrected as shown below:

Column 7, line 31, in Claim 1, delete "space" and insert -- spacer -- therefor.

Column 8, line 30, in Claim 10, delete "outputs" and insert -- output -- therefor.

Signed and Sealed this
Twenty-eighth Day of February, 2012

David J. Kappos
*Director of the United States Patent and Trademark Office*